Patented Sept. 5, 1939

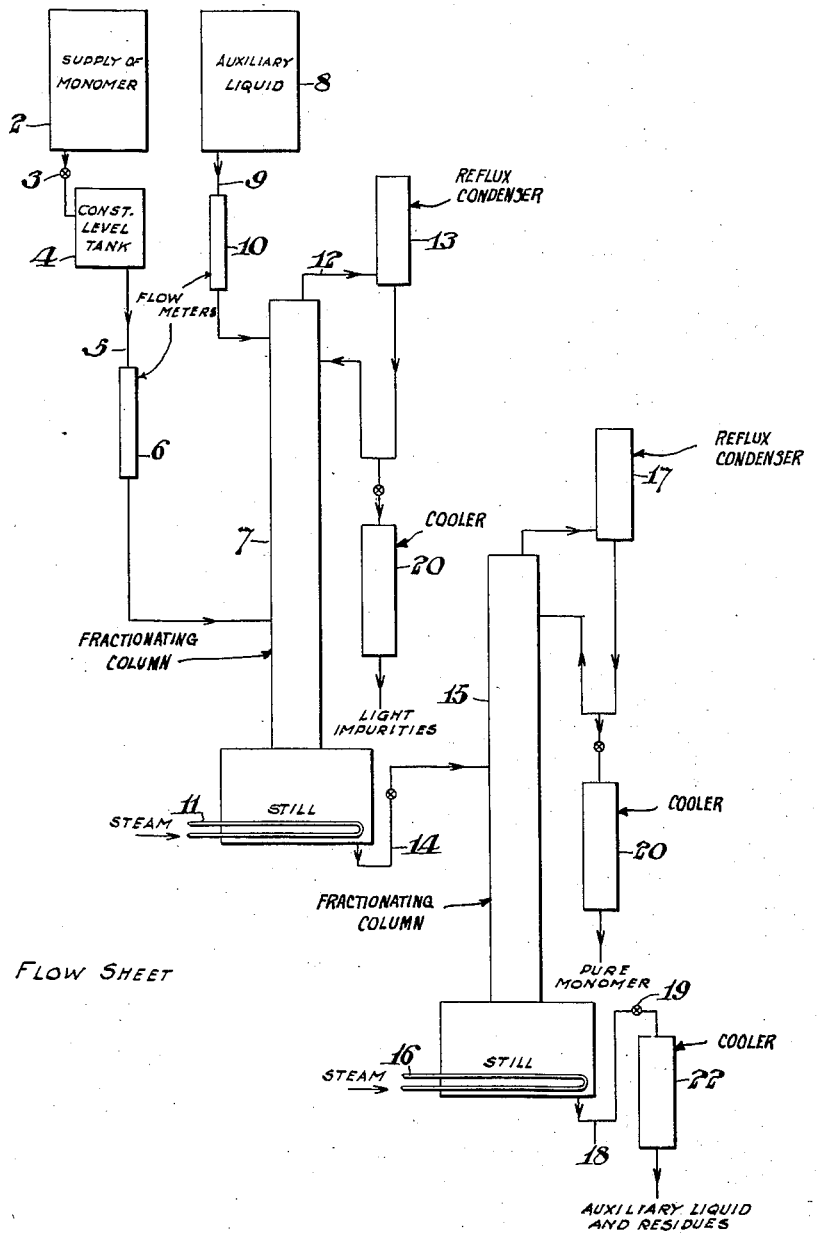

2,171,795

UNITED STATES PATENT OFFICE 2,171,795

DISTILLATION OF POLYMERIZABLE MATERIALS

Carl T. Kautter, Darmstadt, Germany, assignor to Röhm & Haas Company, Philadelphia, Pa.

Application April 22, 1937, Serial No. 138,289
In Germany April 29, 1936

8 Claims. (Cl. 202—57)

This invention relates to a method for purifying easily polymerizable organic compounds by fractional distillation.

In the purification of unsaturated polymerizable organic compounds such as acrylic or vinyl compounds ordinary distillation, that is, distillation without a fractionating column, yields products the purity of which is unsatisfactory. For many purposes it is essential to prepare the compounds in a degree of purity which is attainable only by extremely careful fractionation through columns several meters high. The purification of monomeric acrylic acid and methacrylic acid esters, acrylic and methacrylic nitriles, vinyl acetate, styrene and similar easily polymerizable organic compounds by means of fractional distillation is extraordinarily difficult because polymerization often sets in during the distillation. The polymers consist, according to the material and polymerization conditions, of rubber-like, soft to hard, masses which at times may be in the form of a powder. During distillation masses of polymer may collect at certain parts of the apparatus thus causing obstructions which lead to interruptions in the operation and finally to the destruction of the apparatus. Particularly in fractionation through columns several meters high there is the danger that in the course of time a more or less large amount of polymer, which is very difficult to remove, will collect in the column. Likewise, in the stills which are used for distillation there often remains a large amount of undesirable polymer. Thus under certain conditions there may be a loss of up to 50% in the yield from the distillation.

Fractionation of the above-mentioned materials in a discontinuous process has the disadvantage that individual particles of the material are exposed for a relatively long time to the high temperature necessary for distillation. This is particularly true when a high reflux ratio is used, which is of very great advantage in purifying such materials.

A discontinuous process has the further disadvantage that in the course of the distillation the contents of the still diminish and therefore in most types of apparatus the heating surface after a short time is not completely covered with liquid. As the result incrustations appear on the exposed surface which give rise to interruptions in the process.

For the purification of highly sensitive and easily polymerizable organic compounds a fractionation which can be carried out in a continuous manner is highly desirable. Since the compounds to be purified are generally available in more or less concentrated form (for example, 90–97%) and all that is necessary is to separate a small amount of a low-boiling fraction, the pure product and a residue, the use of two fractionating columns is sufficient. The most convenient arrangement is one in which the low-boiling constituent may be removed at the top of the first column, the desired pure products at the top of the second column and the residue at the foot of the second column. If desired or necessary, the low-boiling fraction as well as the residue can be separated into their individual constituents by means of additional columns.

Even with such a process it is not possible to work continuously without frequent interruptions. In spite of the fact that the time which a particle remains in the column is only about one-twentieth of that of a discontinuous process, it is possible that in time the heating elements used in connection with the column may be coated with polymeric material. As is well known, the polymers of the above-mentioned organic compounds are for the most part poor conductors of heat. Thus if the heating surface becomes coated with the polymer, transfer of heat from the heating element to the material being distilled stops and the operation must be interrupted. For these reasons a continuous process is practically impossible unless it is possible at the same time to prevent the polymerization in some manner.

It is known that the addition to the organic materials of small amounts of so-called stabilizers such as pyrogallol, hydroquinone, dinaphthol, sulfur and other materials will retard polymerization. In no case, however, do these additions completely prevent the polymerization in a continuous operation.

The concentration in which these additions are generally used amounts to about 0.01–1.0%. The use of higher concentrations generally does not correspondingly increase the protective action. These stabilizers are not usually solvents for the polymers. Therefore, they cannot continuously remove the liquid residues from the system and this is an essential condition for continuous operation.

It has now been found that the continuous distillation of the above-mentioned polymerizable compounds can be satisfactorily carried out by running a stream of a high-boiling, unpolymerizable auxiliary liquid through a tower countercurrent to the material being purified. The auxiliary liquid employed should have a boiling point higher than that of the compound being purified and the difference between the boiling point of the auxiliary liquid and that of the monomeric material should be great enough so that an efficient separation of the two is possible in an ordinary fractionating column. These liquids must be miscible in all proportions with the monomeric material and must also be good solvents for the polymer.

The term "auxiliary liquid" as used in the description and claims is intended to include substances which are liquid at ordinary temperatures or which can be rendered liquid by the addition of a second substance of similar character, and which have a boiling point sufficiently higher than the polymerizable liquid to permit easy separation in a fractionating column. The liquids employed may have a stabilizing effect on the monomer in that they prevent or retard polymerization but this is not an essential feature since liquids not possessing this property may also be employed. The addition of 0.5–1.0% of the auxiliary liquid, such as is used for the above-mentioned stabilizers, is not sufficient in this case. The amount of auxiliary liquid for the purposes of the present invention will vary from 5–12% of the weight of the monomeric material depending on conditions.

It has been found that one or more compounds of the group comprising high boiling esters and/or phenolic compounds having a higher boiling point than the monomeric material can be used with advantage as the auxiliary liquid in the purification of the above-mentioned organic compounds. Among these auxiliary liquids for example dibutyl phthalate is suitable, further tricresyl phosphate. Especially suitable is the ordinary anhydrous liquid crude phenol of commerce. Likewise, higher homologs of phenol which are liquid at ordinary temperatures such as the cresols, the xylenols, and β-naphthol may be used. Polyhydric phenols such as hydroquinone, resorcinol, pyrocatechol and polyhydric naphthols may also be used when mixed with sufficient monohydric phenol to render them liquid at ordinary temperatures. Mixtures of any two or more phenolic compounds may also be used.

The process may be carried out in an apparatus such as is shown in the accompanying drawing in which:

The material to be purified is contained in a supply tank 2 from which it flows through a constant level valve 3 to an auxiliary tank 4 and thence through pipe 5 and flow meter 6 into the lower half of the first column 7. A second supply tank 8 contains the auxiliary liquid which flows through pipe 9 and flow meter 10 into the top of column 7. This column is equipped with a heating coil 11 which may be operated by steam or electricity. Any low-boiling materials contained in the monomeric material being purified are distilled out through pipe 12 and are condensed in condenser 13. It is cooled in cooler 20. The remaining monomeric material and the auxiliary liquid flow through pipe 14 approximately into the middle of the second column 15 where they are heated by the heater 16. The monomeric material distills out at the top of the column and is condensed in condenser 17. It is cooled in cooler 21. The auxiliary liquid, free of monomer, containing any material of a higher boiling point than the monomer is withdrawn through pipe 18 and valve 19 and cooler 22; it may then be returned to the storage tank 8 for re-use.

Operating in this manner the entire column 7 is supplied with the auxiliary liquid and no polymerization takes place therein. In the second column 15 distillation takes place fairly rapidly so that the polymerization in it and in the condenser 17 is reduced to a minimum. By this arrangement contact of the pure product, free of the auxiliary liquid, with the heating elements of the column is avoided at all times and thus it is possible to eliminate completely the troublesome incrustation of the heating surface with the polymer. This assures uninterrupted operation.

For practical purposes the amount of auxiliary liquid used should not be less than 5% nor more than about 10–12% of the weight of the material to be distilled. If less auxiliary liquid is used, there is danger of incrusting the heating surface and by the use of more the purity of the product may be affected under certain circumstances. In the latter case it might be necessary to resort to high rectifying columns which for reasons pointed out above is undesirable.

This invention is not limited to the exact apparatus and method of operating shown since many modifications coming within the scope of the following claims will occur to those skilled in the art.

I claim:

1. In the process of fractionally distilling a member of the group consisting of monomeric vinyl, acrylic and methacrylic esters, acrylic and methacrylic nitriles and styrene, the improvement which consists in carrying out the fractionation in a column through which at least one compound of the group consisting of high boiling esters and phenolic compounds having a higher boiling point than the monomeric material flow countercurrent to the vapor, the amount of said compound in the column being from about 5 to about 12% by weight of the monomeric material.

2. In the process of fractionally distilling a member of the group consisting of monomeric vinyl, acrylic and methacrylic esters, acrylic and methacrylic nitriles and styrene, the improvement which consists in carrying out the fractionation in a column through which dibutyl phthalate flows countercurrent to the vapor, the amount of dibutyl phthalate in the column being from about 5 to about 12% by weight of the monomeric material.

3. In the process of fractionally distilling a member of the group consisting of monomeric vinyl, acrylic and methacrylic esters, acrylic and methacrylic nitriles and styrene, the improvement which consists in carrying out the fractionation in a column through which a phenolic compound having a higher boiling point than the monomeric material flows countercurrent to the vapor, the amount of phenolic compound in the column being from about 5% to about 12% of the weight of the monomeric material.

4. In the process of fractionally distilling a member of the group consisting of monomeric vinyl, acrylic and methacrylic esters, acrylic and methacrylic nitriles and styrene, the improvement which consists in carrying out the fractionation in a column through which a monohydric phenol having a higher boiling point than the monomeric material flows countercurrent to the vapor, the amount of the monohydric phenol in the column being from about 5 to about 12% by weight of the monomeric material.

5. In the process of fractionally distilling a member of the group consisting of monomeric vinyl, acrylic and methacrylic esters, acrylic and methacrylic nitriles and styrene, the improvement which consists in carrying out the fractionation in a column through which a mixture of polyhydric and monohydric phenols having a higher boiling point than the monomeric material flows countercurrent to the vapor, the amount of said mixture of phenols in the column being from about 5 to about 12% by weight of the monomeric material.

6. In the process of fractionally distilling a member of the group consisting of monomeric vinyl, acrylic and methacrylic esters, acrylic and methacrylic nitriles and styrene, the improvement which consists in carrying out the fractionation in a column through which a phenolic compound having a higher boiling point than the monomeric material flows countercurrent to the vapor, the amount of said phenolic compound in the column being from about 5 to about 12% by weight of the monomeric material, and separating the monomeric material from the phenolic compound in a second column.

7. The process which comprises subjecting to fractional distillation a member of the group consisting of monomeric vinyl, acrylic and methacrylic esters, acrylic and methacrylic nitriles and styrene by feeding the monomeric material into the lower half of a fractionating column, feeding an auxiliary liquid having a higher boiling point than the material and which is a member of the group consisting of high boiling esters and phenols into the column near the top thereof, the two liquids being fed at such rates that the auxiliary liquid is about 5 to 12% of the total material in the column, and heating the monomeric material, thus causing the vapors to pass upward through the column against a downward flowing stream of the auxiliary liquid.

8. The process which comprises subjecting to fractional distillation a member of the group consisting of monomeric vinyl, acrylic and methacrylic esters, acrylic and methacrylic nitriles and styrene by feeding the monomeric material into the lower half of a fractionating column, feeding a phenol having a higher boiling point than the monomeric material into the column near the top thereof, the two liquids being fed at such rates that the phenol is about 5% to 12% of the total material in the column and heating the monomeric material, thus causing the vapors to pass upward through the column against a downward flowing stream of the phenol.

CARL T. KAUTTER.